United States Patent
Graziosi et al.

(10) Patent No.: US 11,321,878 B2
(45) Date of Patent: May 3, 2022

(54) DECODED TILE HASH SEI MESSAGE FOR V3C/V-PCC

(71) Applicant: SONY CORPORATION, Tokyo (JP)

(72) Inventors: Danillo Graziosi, Flagstaff, AZ (US); Ali Tabatabai, Cupertino, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/161,319

(22) Filed: Jan. 28, 2021

(65) Prior Publication Data
US 2021/0407139 A1 Dec. 30, 2021

Related U.S. Application Data

(60) Provisional application No. 63/046,749, filed on Jul. 1, 2020, provisional application No. 63/045,272, filed on Jun. 29, 2020, provisional application No. 63/044,430, filed on Jun. 26, 2020.

(51) Int. Cl.
| | |
|---|---|
| G06T 9/00 | (2006.01) |
| H04N 19/70 | (2014.01) |
| H04N 19/119 | (2014.01) |
| H04N 19/136 | (2014.01) |
| H04N 19/172 | (2014.01) |
| H04N 19/174 | (2014.01) |
| H04N 19/587 | (2014.01) |

(52) U.S. Cl.
CPC ............... *G06T 9/00* (2013.01); *H04N 19/70* (2014.11)

(58) Field of Classification Search
None
See application file for complete search history.

(56) References Cited

U.S. PATENT DOCUMENTS

| | | | |
|---|---|---|---|
| 10,368,078 B2 | 7/2019 | Auyeung et al. | |
| 10,687,055 B2 | 6/2020 | Wang | |
| 2007/0080830 A1 | 4/2007 | Sacks | |
| 2015/0271529 A1 | 9/2015 | Wang et al. | |
| 2016/0277761 A1 | 9/2016 | Li et al. | |
| 2017/0039765 A1 | 2/2017 | Zhou et al. | |
| 2019/0197739 A1 | 6/2019 | Sinharoy et al. | |
| 2020/0145677 A1 | 5/2020 | Maeda et al. | |
| 2020/0195946 A1* | 6/2020 | Choi | H04N 19/132 |
| 2021/0217200 A1* | 7/2021 | Oh | H04N 19/597 |
| 2021/0282117 A1* | 9/2021 | Bivans | G05B 19/058 |

FOREIGN PATENT DOCUMENTS

AU 2016204304 B2 6/2018

OTHER PUBLICATIONS

The International Search Report with Written Opinion dated Sep. 2, 2021 for PCT Application: PCT/2021/038163.

* cited by examiner

*Primary Examiner* — Christopher Braniff
(74) *Attorney, Agent, or Firm* — Haverstock & Owens, A Law Corporation

(57) ABSTRACT

A new hash Supplemental Enhancement Information (SEI) message for the V3C/V-PCC atlas frame is described herein. The message is used to signal the hash values that are computed for the syntax elements associated with each patch. The hash SEI message is able to be used for the V3C/V-PCC tile level and optionally for atlas level conformance testing. The hash is able to be used to confirm that the decoded values by the decoder are the same as the original values that were encoded by the encoder.

23 Claims, 2 Drawing Sheets

US 11,321,878 B2

DECODED TILE HASH SEI MESSAGE FOR V3C/V-PCC

CROSS-REFERENCE TO RELATED APPLICATION(S)

This application claims priority under 35 U.S.C. § 119(e) of the U.S. Provisional Patent Application Ser. No. 63/046,749, filed Jul. 1, 2020 and titled, "DECODED TILE HASH SEI MESSAGE FOR V3C/V-PCC," U.S. Provisional Patent Application Ser. No. 63/045,272, filed Jun. 29, 2020 and titled, "DECODED TILE HASH SEI MESSAGE FOR V3C/V-PCC," and U.S. Provisional Patent Application Ser. No. 63/044,430, filed Jun. 26, 2020 and titled, "DECODED TILE HASH SEI MESSAGE FOR V3C/V-PCC," which are hereby incorporated by reference in their entireties for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress point clouds based on projection from 3D to 2D is being standardized. The method, also known as V-PCC (video-based point cloud compression), maps the 3D point cloud data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

SUMMARY OF THE INVENTION

A new hash Supplemental Enhancement Information (SEI) message for the V3C/V-PCC atlas frame is described herein. The message is used to signal the hash values that are computed for the syntax elements associated with each patch. The hash SEI message is able to be used for the V3C/V-PCC tile level and optionally for atlas level conformance testing. The hash is able to be used to confirm that the decoded values by the decoder are the same as the original values that were encoded by the encoder.

In one aspect, a method comprises encoding point cloud content to generate encoded point cloud content, generating and sending hash information, decoding the encoded point cloud content and verifying the decoded content using the hash information. Encoding the point cloud content includes using a V-PCC encoding implementation which compresses point clouds based on projection from 3D to 2D, wherein encoding the point cloud content includes mapping the 3D point cloud data into several 2D patches and arranging the patches into an atlas image, which is subsequently encoded with a video encoder, wherein atlas images correspond to geometry of points, respective texture, and an occupancy map that indicates which positions are to be considered for point cloud reconstruction. The hash information is generated using syntax elements and/or variable values of the point cloud content. The hash information is sent for an atlas. The hash information is sent for a block to patch of an atlas. The hash information is sent for a tile. The hash information is sent for a block to patch of a tile. The hash information is sent in a Supplemental Enhancement Information (SEI) message. The SEI message includes tile-based "BlockToPatchMap[ ][ ]" hash value information. The hash information is generated using an implementation selected from the group consisting of MD5, CRC and checksum.

In another aspect, an apparatus comprises a non-transitory memory for storing an application, the application for: receiving encoded point cloud content, receiving hash information, decoding the encoded point cloud content and verifying the decoded content using the hash information and a processor coupled to the memory, the processor configured for processing the application. The hash information is generated using syntax elements and/or variable values of the point cloud content. The hash information is sent for an atlas. The hash information is sent for a block to patch of an atlas. The hash information is sent for a tile. The hash information is sent for a block to patch of a tile. The hash information is sent in a Supplemental Enhancement Information (SEI) message. The SEI message includes tile-based "BlockToPatchMap[ ][ ]" hash value information. The hash information is generated using an implementation selected from the group consisting of MD5, CRC and checksum.

In another aspect, a system comprises one or more cameras for acquiring three dimensional content, an encoder for: encoding the three dimensional content to generate encoded point cloud content and generating and sending hash information and a decoder for: decoding the encoded point cloud content and verifying the decoded content using the hash information. Encoding the three dimensional content includes using a V-PCC encoding implementation which compresses three dimensional content based on projection from 3D to 2D, wherein encoding the three dimensional content includes mapping the 3D point cloud data into several 2D patches and arranging the patches into an atlas image, which is subsequently encoded with a video encoder, wherein atlas images correspond to geometry of points, respective texture, and an occupancy map that indicates which positions are to be considered for point cloud reconstruction. The hash information is generated using syntax elements and/or variable values of the three dimensional content. The hash information is sent for an atlas. The hash information is sent for a block to patch of an atlas. The hash information is sent for a tile. The hash information is sent for a block to patch of a tile. The hash information is sent in a Supplemental Enhancement Information (SEI) message. The SEI message includes tile-based "BlockToPatchMap[ ][ ]" hash value information. The hash information is generated using an implementation selected from the group consisting of MD5, CRC and checksum.

DETAILED DESCRIPTION OF THE PREFERRED EMBODIMENT

Figure 1:
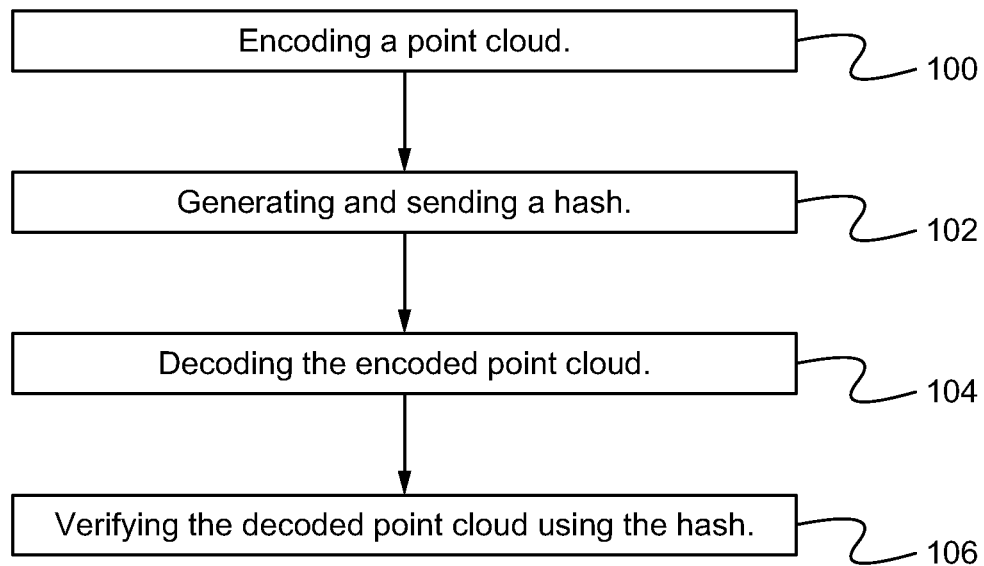
FIG. 1 illustrates a flowchart of a method of encoding and decoding content according to some embodiments.

A new hash Supplemental Enhancement Information (SEI) message for the V3C/V-PCC atlas frame is described herein. It is used to signal the hash values that are computed, in a tile and patch scanning order, for all the syntax elements associated with each patch. It is also asserted that the hash SEI message can be used for the V3C/V-PCC tile level and optionally for atlas level conformance testing.

The hash is able to be used to confirm that the decoded values by the decoder are the same as the original values that were encoded by the encoder.

Decoded Atlas Information Hash SEI Message

It has been pointed out that a decoder capable to determine the "BlockToPatchMap[ ][ ]" information correctly, may not be able to decode properly other information important for the point cloud reconstruction. Described herein is an atlas information hash SEI message with the option to include the tile-based "BlockToPatchMap[ ][ ]" hash value information. This combination ensures proper decoding of block to volume information and the reconstruction of volumetric boxes that correspond to 2D to 3D patch transforms.

Decoded Atlas Information Hash SEI Message Syntax

Table 1 provides the syntax structure of the decoded atlas information hash SEI message. It is a suffix SEI message and shall be carried in a NAL unit of type NAL_SUFFIX_SEI, and its payloadType value is set to 21. The main application of the decoded atlas information hash SEI message is for debugging purposes and for the conformance testing of an atlas decoder. Options for both atlas and tile-based hash value calculations are provided. This is done by going through all elements associated with each patch within the tile as well as all the tiles within the atlas. As an example, for non-EOM and RAW patches, the variables Patch2dPosX[p], Patch2dPosY[p], Patch2dSizeX[p], Patch2dSizeY[p], Patch3dPosX[p], Patch3dPosY[p], Patch3dPosMinZ[p], PatchOrientationIndex[p], PatchLoDScaleX[p], and PatchLoDScaleY[p], in a pre-specified order, should be processed in tile followed by patch coding order. A similar approach can also be taken for EOM/RAW patches depending also on whether these are related to the regular or the auxiliary streams. Several high level variables/syntax elements are included that are used, as the "frame header" for the atlas based hash message checksum calculations.

TABLE 1

Decoded atlas info hash SEI syntax

| | Descriptor |
|---|---|
| decoded_atlas_info_hash( payloadSize ) { | |
|     daih_hash_type | u(8) |
|     daih_decoded_atlas_hash_present_flag | u(1) |
|     daih_decoded_atlas_b2p_hash_present_flag | u(1) |
|     daih_decoded_atlas_tiles_hash_present_flag | u(1) |
|     daih_decoded_atlas_tiles_b2p_hash_present_flag | u(1) |
|     daih_reserved_4bits | u(4) |
|     if( decoded_atlas_hash_present_flag ) | |
|         if( daih_hash_type == 0 ) | |
|             for( i = 0; i < 16; i++ ) | |
|                 daih_atlas_md5[ i ] | b(8) |
|         else if( daih_hash_type == 1) | |
|             daih_atlas_crc | u(16) |
|         else if( hash_type == 2 ) | |
|             daih_atlas_checksum | u(32) |
|     if( decoded_atlas_b2p_hash_present_flag ) | |
|         if( daih_hash_type == 0 ) | |
|             for( i = 0; i < 16; i++ ) | |
|                 daih_atlas_b2p_md5[ i ] | b(8) |
|         else if( daih_hash_type == 1) | |
|             daih_atlas_b2p_crc | u(16) |
|         else if( daih_hash_type == 2) | |
|             daih_atlas_b2p_checksum | u(32) |
|     if( decoded_atlas_tiles_hash_present flag \|\| | |
| decoded_atlas_tiles_b2p_hash_present_flag ) { | |
|         daih_num_tiles_minus1 | ue(v) |
|         daih_tile_id_len_minus1 | ue(v) |
|         for( t = 0; t <= daih_num_tiles_minus1; t++ ) | |
|             daih_tile_id[ t ] | u(v) |
|         for( t = 0; t <= daih_num_tiles_minus1; t++ ) { | |
|             j = TileIdToIndex[ daih_tile_id[ t ] ] | |
|             if( decoded_atlas_tiles_hash_present_flag ) | |
|                 if( daih_hash_type == 0 ) | |
|                     for( i = 0; i < 16; i++ ) | |
|                         daih_atlas_tiles_md5[ j ][ i ] | b(8) |
|                 else if( daih_hash_type == 1) | |
|                     daih_atlas_tiles_crc[ j ] | u(16) |
|                 else if( hash_type == 2 ) | |
|                     daih_atlas_tiles_checksum[ j ] | u(32) |
|             if( decoded_atlas_tiles_b2p_hash_present_flag ) | |
|                 if( daih_hash_type == 0 ) | |

TABLE 1-continued

Decoded atlas info hash SEI syntax

|  | Descriptor |
|---|---|
|         for( i = 0; i < 16; i++ ) | |
|             daih_atlas_tiles_b2p_md5[ j ][ i ] | b(8) |
|         else if( daih_hash_type == 1) | |
|             daih_atlas_tiles_b2p_crc[ j ] | u(16) |
|         else if( hash_type = = 2 ) | |
|             daih_atlas_tiles_b2p_checksum[ j ] | u(32) |
|     } | |
|   } | |
| } | |

Decoded Atlas Information SEI Message Semantics

The semantics of the fields of the decoded atlas information hash SEI message are as follows:

First, it is assumed that all the syntax elements are stored as unsigned 16-bit Numbers. Starting with high level syntax variables, the derivation of an atlas level hash value is shown below.

```
aLen = 0
atlasData[ aLen++ ] = asps_frame_ width && 0XFF
atlasData[ aLen++ ] = (asps_frame_width >> 8 ) && 0XFF
atlasData[ aLen++ ] = asps_frame_height && 0XFF
atlasData[ aLen++ ] = (asps_frame_height >> 8) && 0XFF
atlasData[ aLen++ ] = AuxVideoWidth && 0XFF
atlasData[ aLen++ ] = (AuxVideoWidth >> 8 ) && 0XFF
atlasData[ aLen++ ] = oi_occupancy_nominal_2d_bitdepth_minus1 && 0XFF
atlasData[ aLen++ ] = (oi_occupancy_nominal_2d_bitdepth_minus1 >> 8) && 0XFF
atlasData[ aLen++ ] = oi_occupancy_MSB_align_flag && 0XFF
atlasData[ aLen++ ] = (oi_occupancy_MSB_align_flag >> 8) && 0XFF
atlasData[ aLen++ ] = oi_lossy_occupancy_map_compression_threshold && 0XFF
atlasData[ aLen++ ] = (oi_lossy_occupancy_map_compression_threshold >> 8) && 0XFF
atlasData[ aLen++ ] = vps_multiple_map_streams_present_flag && 0XFF
atlasData[ aLen++ ] = (vps_multiple_map_streams_present_flag >> 8) && 0XFF
atlasData[ aLen++ ] = vps_map_count_minus1 && 0XFF
atlasData[ aLen++ ] = (vps_map_count_minus1 >> 8) && 0XFF
for(i = 0; i < vps_map_count_minus1 + 1; i++) {
atlasData[ aLen++ ] = AttributeMapAbsoluteCodingEnabledFlag [ i ] && 0XFF
atlasData[ aLen++ ] = (AttributeMapAbsoluteCodingEnabledFlag[ i ]>> 8) && 0XFF
atlasData[ aLen++ ] = MapPredictorIndex[ i ] && 0XFF
atlasData[ aLen++ ] = (MapPredictorIndex[ i ] >> 8) && 0XFF
}
atlasData[ aLen++ ] = gi_geometry_nominal_2d_bitdepth_minus1 && 0XFF
atlasData[ aLen++ ] = (gi_geometry_nominal_2d_bitdepth_minus1 >> 8) && 0XFF
atlasData[ aLen++ ] = gi_geometry_3d_coordinates_bitdepth_minus1 && 0XFF
atlasData[ aLen++ ] = (gi_geometry_3d_coordinates_bitdepth_minus1 >> 8) && 0XFF
atlasData[ aLen++ ] = gi_geometry_MSB_align_flag && 0XFF
atlasData[ aLen++ ] = (gi_geometry_MSB_align_flag >> 8) && 0XFF
atlasData[ aLen++ ] = ai_attribute_count && 0XFF
atlasData[ aLen++ ] = (ai_attribute_count >> 8) && 0XFF
for(i = 0; i < ai_attribute_count; i++) {
atlasData[ aLen++ ] = ai_attribute_dimension_partitions_minus1[ i ] && 0XFF
atlasData[ aLen++ ] = (ai_attribute_dimension_partitions_minus1[ i ] >> 8) && 0XFF
for(j = 0; j < ai_attribute_dimension_partitions_minus1[ i ] + 1; j++) {
atlasData[ aLen++ ] = ai_attribute_partition_channels_minus1[ i ][ j ] && 0XFF
atlasData[ aLen++ ] = (ai_attribute_partition_channels_minus1[ i ][ j ] >> 8) && 0XFF
}
atlasData[ aLen++ ] = ai_attribute_nominal_2d_bitdepth_minus1[ i ] && 0XFF
atlasData[ aLen++ ] = (ai_attribute_nominal_2d_bitdepth_minus1[ i ] >> 8) && 0XFF
atlasData[ aLen++ ] = ai_attribute_MSB_align_flag[ i ] && 0XFF
atlasData[ aLen++ ] = (ai_attribute_MSB_align_flag [ i ] >> 8) && 0XFF
}
atlasData[ aLen++ ] = asps_geometry_3d_bitdepth_minus1 && 0XFF
atlasData[ aLen++ ] = (asps_geometry_3d_bitdepth_minus1 >> 8) && 0XFF
atlasData[ aLen++ ] = asps_geometry_2d_bitdepth_minus1 && 0XFF
atlasData[ aLen++ ] = (asps_geometry_2d_bitdepth_minus1 >> 8) && 0XFF
atlasData[ aLen++ ] = asps_map_count_minus1 && 0XFF
atlasData[ aLen++ ] = (asps_map_count_minus1 >> 8) && 0XFF
atlasData[ aLen++ ] = asps_pixel_deinterleaving_enabled_flag && 0XFF
atlasData[ aLen++ ] = (asps_pixel_deinterleaving_enabled_flag >> 8) && 0XFF
for(i = 0; i < asps_map_count_minus1 + 1; i++) {
atlasData[ aLen++ ] = asps_map_pixel_deinterleaving_flag[ i ] && 0XFF
```

```
atlasData[ aLen++ ] = (asps_map_pixel_deinterleaving_flag[ i ] >> 8) && 0XFF
}
atlasData[ aLen++ ] = asps_point_local_reconstruction_enabled_flag && 0XFF
atlasData[ aLen++ ] = asps_point_local_reconstruction_enabled_flag >> 8) && 0XFF
for(i = 0; i < asps_map_count_minus1 + 1; i++) {
atlasData[ aLen++ ] = plri_point_local_reconstruction_map_flag[ i ] && 0XFF
atlasData[ aLen++ ] = (plri_point_local_reconstruction_map_flag[ i ] >> 8) && 0XFF
atlasData[ aLen++ ] = plri_number_of_modes_minus1[ i ] && 0XFF
atlasData[ aLen++ ] = (plri_number_of_modes_minus1[ i ] >> 8) && 0XFF
for(j = 0; j < plri_number_of_modes_minus1[ i ] + 1; j++) {
atlasData[ aLen++ ] = plri_interpolate_flag[ i ][ j ] && 0XFF
atlasData[ aLen++ ] = (plri_interpolate_flag[ i ] [ j ] >> 8)&& 0XFF
atlasData[ aLen++ ] = plri_filling_flag[ i ][ j ] && 0XFF
atlasData[ aLen++ ] = (plri_filling_flag[ i ][ j ] >> 8) && 0XFF
atlasData[ aLen++ ] = plri_minimum_depth[ i ] [ j ] && 0XFF
atlasData[ aLen++ ] = (plri_minimum_depth[ i ][ j ] >> 8) && 0XFF
atlasData[ aLen++ ] = plri_neighbour_minus1[ i ][ j ] && 0XFF
atlasData[ aLen++ ] = (plri_neighbour_minus1[ i ][ j ] >> 8) && 0XFF
}
atlasData[ aLen++ ] = plri_block_threshold_per_patch_minus1[ i ] && 0XFF
atlasData[ aLen++ ] = (plri_block_threshold_per_patch_minus1[ i ]>> 8) && 0XFF
}
atlasData[ aLen++ ] = asps_eom_patch_enabled_flag && 0XFF
atlasData[ aLen++ ] = (asps_eom_patch_enabled_flag >> 8) && 0XFF
atlasData[ aLen++ ] = (asps_vpcc_surface_thickness_minus1 >> 8) && 0XFF
atlasData[ aLen++ ] = asps_vpcc_surface_thickness_minus1 && 0XFF
atlasData[ aLen++ ] = (asps_vpcc_surface_thickness_minus1 >> 8) && 0XFF
atlasData[ aLen++ ] = afps_output_flag_present_flag && 0XFF
atlasData[ aLen++ ] = (afps_output_flag_present_flag >> 8) && 0XFF
for( tileIdx = 0; tileIdx < afti_num_tiles_in_atlas_frame_minus1 + 1; tileIdx++ ) {
t = TileIndexToId[ tileIdx ]
    for( p = 0; p < AtduTotalNumberOfPatches[ t ]; p++ ) {
        if( ( atdu_patch_mode[ p ] == P_RAW) || ( atdu_patch_mode[ p ] == I_RAW) ) {
            if ( rpdu_patch_in_auxiliary_video_flag[ t ][ p ] == 1 ) {
                atlasData[ aLen++ ] = AuxPatch2dPosX[ t ][ p ] & 0xFF
                atlasData[ aLen++ ] = (AuxPatch2dPosX[ t ][ p ] >> 8) & 0xFF
                atlasData[ aLen++ ] = AuxPatch2dPosY[ t ][ p ] & 0xFF
                atlasData[ aLen++ ] = (AuxPatch2dPosY[ t ][ p ] >> 8) & 0xFF
                atlasData[ aLen++ ] = AuxPatch2dSizeX[ t ][ p ] & 0xFF
                atlasData[ aLen++ ] = (AuxPatch2dSizeX[ t ][ p ] >> 8) & 0xFF
                atlasData[ aLen++ ] = AuxPatch2dSizeY[ t ][ p ] & 0xFF
                atlasData[ aLen++ ] = (AuxPatch2dSizeY[ t ][ p ] >> 8) & 0xFF
                atlasData[ aLen++ ] = AuxPatch3dPosX[ t ][ p ] & 0xFF
                atlasData[ aLen++ ] = (AuxPatch3dPosX[ t ][ p ] >> 8) & 0xFF
                atlasData[ aLen++ ] = AuxPatch3dPosY[ t ][ p ] & 0xFF
                atlasData[ aLen++ ] = (AuxPatch3dPosY[ t ][ p ] >> 8) & 0xFF
                atlasData[ aLen++ ] = AuxPatch3dPosY[ t ][ p ] & 0xFF
                atlasData[ aLen++ ] = (AuxPatch3dPosY[ t ][ p ] >> 8) & 0xFF
                atlasData[ aLen++ ] = AuxPatch3dPosZ[ t ][ p ] & 0xFF
                atlasData[ aLen++ ] = (AuxPatch3dPosZ[ t ][ p ] >> 8) & 0xFF
            } else {
                atlasData[ aLen++ ] = Patch2dPosX[ t ][ p ] & 0xFF
                atlasData[ aLen++ ] = (Patch2dPosX[ t ][ p ] >> 8) & 0xFF
                atlasData[ aLen++ ] = Patch2dPosY[ t ][ p ] & 0xFF
                atlasData[ aLen++ ] = (Patch2dPosY[ t ][ p ] >> 8) & 0xFF
                atlasData[ aLen++ ] = Patch2dSizeX[ t ][ p ] & 0xFF
                atlasData[ aLen++ ] = (Patch2dSizeX[ t ][ p ] >> 8) & 0xFF
                atlasData[ aLen++ ] = Patch2dSizeY[ t ][ p ] & 0xFF
                atlasData[ aLen++ ] = (Patch2dSizeY[ t ][ p ] >> 8) & 0xFF
                atlasData[ aLen++ ] = Patch3dPosX[ t ][ p ] & 0xFF
                atlasData[ aLen++ ] = (Patch3dPosX[ t ][ p ] >> 8) & 0xFF
                atlasData[ aLen++ ] = Patch3dPosY[ t ][ p ] & 0xFF
                atlasData[ aLen++ ] = (Patch3dPosY[ t ][ p ] >> 8) & 0xFF
                atlasData[ aLen++ ] = Patch3dPosY[ t ][ p ] & 0xFF
                atlasData[ aLen++ ] = (Patch3dPosY[ t ][ p ] >> 8) & 0xFF
                atlasData[ aLen++ ] = Patch3dPosZ[ t ][ p ] & 0xFF
                atlasData[ aLen++ ] = (Patch3dPosZ[ t ][ p ] >> 8) & 0xFF
            }
        } else {
            if( ( atdu_patch_mode[ p ] == P_EOM) ||
( atdu_patch_mode[ p ] == I_EOM) ) {
                atlasData[ aLen++ ] = EomPatch2dPosX[ t ][ p ] & 0xFF
                atlasData[ aLen++ ] = (EomPatch2dPosX[ t ][ p ] >> 8) & 0xFF
                atlasData[ aLen++ ] = EomPatch2dPosY[ t ][ p ] & 0xFF
                atlasData[ aLen++ ] = (EomPatch2dPosY[ t ][ p ] >> 8) & 0xFF
                atlasData[ aLen++ ] = EomPatch2dSizeX[ t ][ p ] & 0xFF
                atlasData[ aLen++ ] = (EomPatch2dSizeX[ t ][ p ] >> 8) & 0xFF
                atlasData[ aLen++ ] = EomPatch2dSizeY[ t ][ p ] & 0xFF
                atlasData[ aLen++ ] = (EomPatch2dSizeY[ t ][ p ] >> 8) & 0xFF
```

-continued

```
        } else {
            atlasData[ aLen++ ] = Patch2dPosX[ t ][ p ] & 0xFF
            atlasData[ aLen++ ] = (Patch2dPosX[ t ][ p ] >> 8) & 0xFF
            atlasData[ aLen++ ] = Patch2dPosY[ t ][ p ] & 0xFF
            atlasData[ aLen++ ] = (Patch2dPosY[ t ][ p ] >> 8) & 0xFF
            atlasData[ aLen++ ] = Patch2dSizeX[ t ][ p ] & 0xFF
            atlasData[ aLen++ ] = (Patch2dSizeX[ t ][ p ] >> 8) & 0xFF
            atlasData[ aLen++ ] = Patch2dSizeY[ t ][ p ] & 0xFF
            atlasData[ aLen++ ] = (Patch2dSizeY[ t ][ p ] >> 8) & 0xFF
            atlasData[ aLen++ ] = Patch3dPosX[ t ][ p ] & 0xFF
            atlasData[ aLen++ ] = (Patch3dPosX[ t ][ p ] >> 8) & 0xFF
            atlasData[ aLen++ ] = Patch3dPosY[ t ][ p ] & 0xFF
            atlasData[ aLen++ ] = (Patch3dPosY[ t ][ p ] >> 8) & 0xFF
            atlasData[ aLen++ ] = Patch3dPosMinZ[ t ][ p ] & 0xFF
            atlasData[ aLen++ ] = (Patch3dPosMinZ[ t ][ p ] >> 8) & 0xFF
            atlasData[ aLen++ ] = PatchOrientationIndex[ t ][ p ] & 0xFF
            atlasData[ aLen++ ] = (PatchOrientationIndex[ t ][ p ] >> 8) & 0xFF
            atlasData[ aLen++ ] = PatchLoDScaleX[ t ][ p ] & 0xFF
            atlasData[ aLen++ ] = (PatchLoDScaleX[ t ][ p ] >> 8) & 0xFF
            atlasData[ aLen++ ] = PatchLoDScaleY[ t ][ p ] & 0xFF
            atlasData[ aLen++ ] = (PatchLoDScaleY[ t ][ p ] >> 8) & 0xFF
        }
     }
   }
}
Similarly, for atlas based BlockToPatch[ ][ ] there is the following:
b2paLen = 0
for( tileIdx = 0; tileIdx < afti_num_tiles_in_atlas_frame_minus1 + 1; tileIdx++ ) {
t = TileIndexToId[ tileIdx ]
    BlockToPatchMapWidth = Ceil(TileGroupWidaih[ t ]/PatchPackingBlockSize)
    BlockToPatchMapHeight = Ceil(TileGroupHeight[ t ]/PatchPackingBlockSize)
    for( y = 0; y < BlockToPatchMapHeight; y++ ) {
        for( x = 0; x < BlockToPatchMapWidth ; x++ ) {
            atlasB2pData[ b2paLen++ ] = BlockToPatchMap[ y ][ x ] & 0xFF
            atlasB2pData[ b2paLen++ ] = (BlockToPatchMap[ y ][ x ] >> 8 ) & 0xFF
        }
    }
}
```

The derivation of tile-based hash values is shown, below:

```
for( tileIdx = 0; tileIdx < afti_num_tiles_in_atlas_frame_minus1 + 1; tileIdx++ ) {
t = TileIndexToId[ tileIdx ]
    tLen = 0
    for( p = 0; p < AtduTotalNumberOfPatches[ t ]; p++ ) {
        if( ( atdu_patch_mode[ p ] == P_RAW) || ( atdu_patch_mode[ p ] == I_RAW) ) {
            if ( rpdu_patch_in_auxiliary_video_flag[ t ][ p ] == 1 ) {
                tileData[ t ][ tLen++ ] = AuxPatch2dPosX[ t ][ p ] & 0xFF
                tileData[ t ][ tLen++ ] = (AuxPatch2dPosX[ t ][ p ] >> 8) & 0xFF
                tileData[ t ][ tLen++ ] = AuxPatch2dPosY[ t ][ p ] & 0xFF
                tileData[ t ][ tLen++ ] = (AuxPatch2dPosY[ t ][ p ] >> 8) & 0xFF
                tileData[ t ][ tLen++ ] = AuxPatch2dSizeX[ t ][ p ] & 0xFF
                tileData[ t ][ tLen++ ] = (AuxPatch2dSizeX[ t ][ p ] >> 8) & 0xFF
                tileData[ t ][ tLen++ ] = AuxPatch2dSizeY[ t ][ p ] & 0xFF
                tileData[ t ][ tLen++ ] = (AuxPatch2dSizeY[ t ][ p ] >> 8) & 0xFF
                tileData[ t ][ tLen++ ] = AuxPatch3dPosX[ t ][ p ] & 0xFF
                tileData[ t ][ tLen++ ] = (AuxPatch3dPosX[ t ][ p ] >> 8) & 0xFF
                tileData[ t ][ tLen++ ] = AuxPatch3dPosY[ t ][ p ] & 0xFF
                tileData[ t ][ tLen++ ] = (AuxPatch3dPosY[ t ][ p ] >> 8) & 0xFF
                tileData[ t ][ tLen++ ] = AuxPatch3dPosY[ t ][ p ] & 0xFF
                tileData[ t ][ tLen++ ] = (AuxPatch3dPosY[ t ][ p ] >> 8) & 0xFF
                tileData[ t ][ tLen++ ] = AuxPatch3dPosZ[ t ][ p ] & 0xFF
                tileData[ t ][ tLen++ ] = (AuxPatch3dPosZ[ t ][ p ] >> 8) & 0xFF
            } else {
                tileData[ t ][ tLen++ ] = Patch2dPosX[ t ][ p ] & 0xFF
                tileData[ t ][ tLen++ ] = (Patch2dPosX[ t ][ p ] >> 8) & 0xFF
                tileData[ t ][ tLen++ ] = Patch2dPosY[ t ][ p ] & 0xFF
                tileData[ t ][ tLen++ ] = (Patch2dPosY[ t ][ p ] >> 8) & 0xFF
                tileData[ t ][ tLen++ ] = Patch2dSizeX[ t ][ p ] & 0xFF
                tileData[ t ][ tLen++ ] = (Patch2dSizeX[ t ][ p ] >> 8) & 0xFF
                tileData[ t ][ tLen++ ] = Patch2dSizeY[ t ][ p ] & 0xFF
                tileData[ t ][ tLen++ ] = (Patch2dSizeY[ t ][ p ] >> 8) & 0xFF
                tileData[ t ][ tLen++ ] = Patch3dPosX[ t ][ p ] & 0xFF
                tileData[ t ][ tLen++ ] = (Patch3dPosX[ t ][ p ] >> 8) & 0xFF
                tileData[ t ][ tLen++ ] = Patch3dPosY[ t ][ p ] & 0xFF
```

```
                tileData[ t ][ tLen++ ] = (Patch3dPosY[ t ][ p ] >> 8) & 0xFF
                tileData[ t ][ tLen++ ] = Patch3dPosY[ t ][ p ] & 0xFF
                tileData[ t ][ tLen++ ] = (Patch3dPosY[ t ][ p ] >> 8) & 0xFF
                tileData[ t ][ tLen++ ] = Patch3dPosZ[ t ][ p ] & 0xFF
                tileData[ t ][ tLen++ ] = (Patch3dPosZ[ t ][ p ] >> 8) & 0xFF
            }
        } else {
            if( ( atdu_patch_mode[ p ] == P_EOM) ||
( atdu_patch_mode[ p ] == I_EOM) ) {
                tileData[ t ][ tLen++ ] = EomPatch2dPosX[ t ][ p ] & 0xFF
                tileData[ t ][ tLen++ ] = (EomPatch2dPosX[ t ][ p ] >> 8) & 0xFF
                tileData[ t ][ tLen++ ] = EomPatch2dPosY[ t ][ p ] & 0xFF
                tileData[ t ][ tLen++ ] = (EomPatch2dPosY[ t ][ p ] >> 8) & 0xFF
                tileData[ t ][ tLen++ ] = EomPatch2dSizeX[ t ][ p ] & 0xFF
                tileData[ t ][ tLen++ ] = (EomPatch2dSizeX[ t ][ p ] >> 8) &
0xFF
                tileData[ t ][ tLen++ ] = EomPatch2dSizeY[ t ][ p ] & 0xFF
                tileData[ t ][ tLen++ ] = (EomPatch2dSizeY[ t ][ p ] >> 8) &
0xFF
            } else {
                tileData[ t ][ tLen++ ] = Patch2dPosX[ t ][ p ] & 0xFF
                tileData[ t ][ tLen++ ] = (Patch2dPosX[ t ][ p ] >> 8) & 0xFF
                tileData[ t ][ tLen++ ] = Patch2dPosY[ t ][ p ] & 0xFF
                tileData[ t ][ tLen++ ] = (Patch2dPosY[ t ][ p ] >> 8) & 0xFF
                tileData[ t ][ tLen++ ] = Patch2dSizeX[ t ][ p ] & 0xFF
                tileData[ t ][ tLen++ ] = (Patch2dSizeX[ t ][ p ] >> 8) & 0xFF
                tileData[ t ][ tLen++ ] = Patch2dSizeY[ t ][ p ] & 0xFF
                tileData[ t ][ tLen++ ] = (Patch2dSizeY[ t ][ p ] >> 8) & 0xFF
                tileData[ t ][ tLen++ ] = Patch3dPosX[ t ][ p ] & 0xFF
                tileData[ t ][ tLen++ ] = (Patch3dPosX[ t ][ p ] >> 8) & 0xFF
                tileData[ t ][ tLen++ ] = Patch3dPosY[ t ][ p ] & 0xFF
                tileData[ t ][ tLen++ ] = (Patch3dPosY[ t ][ p ] >> 8) & 0xFF
                tileData[ t ][ tLen++ ] = Patch3dPosMinZ [ t ][ p ] & 0xFF
                tileData[ t ][ tLen++ ] = (Patch3dPosMinZ [ t ][ p ] >> 8) & 0xFF
                tileData[ t ][ tLen++ ] = PatchOrientationIndex [ t ][ p ] & 0xFF
                tilcData[ t ][ tLen++ ] = (PatchOrientationIndex [ t ][ p ] >> 8) &
0xFF
                tileData[ t ][ tLen++ ] = PatchLoDScaleX [ t ][ p ] & 0xFF
                tileData[ t ][ tLen++ ] = (PatchLoDScaleX [ t ][ p ] >> 8) & 0xFF
                tileData[ t ][ tLen++ ] = PatchLoDScaleY [ t ][ p ] & 0xFF
                tileData[ t ][ tLen++ ] = (PatchLoDScaleY [ t ][ p ] >> 8) & 0xFF
            }
        }
    }
    dataLen[ t ] = tLen
}
```

For tile-based, BlockToPatch[ ][ ], atlasB2pData[ ] array is generated as follows:

```
for( tileIdx = 0; tileIdx < afti_num_tiles_in_atlas_frame_minus1 + 1; tileIdx++ ) {
t = TileIndexToId[ tileIdx ]
b2ptLen=0
    BlockToPatchMapWidth = Ceil(TileGroupWidaih[ t ]/PatchPackingBlockSize)
    BlockToPatchMapHeight = Ceil(TileGroupHeight[ t ]/PatchPackingBlockSize)
    for( y = 0; y < BlockToPatchMapHeight; y++ ) {
        for( x = 0; x < BlockToPatchMapWidth ; x++ ) {
atlasB2pData[ b2paLen++ ] = tileB2pData[ b2ptLen++ ] = BlockToPatchMap[ y ][ x ] & 0xFF
atlasB2pData[ b2paLen++ ] = tileB2pData[ b2ptLen++ ] = (BlockToPatchMap[ y ][ x ] >> 8 ) &
0xFF
        }
    }
    dataB2pLen[ t ] = b2ptLen
}
``` daih_hash_type indicates the method used to calculate the checksum according to the Table 2, below. Values of daih_hash_type that are not listed in the Table are reserved for future use by ITU-T ISO/IEC and shall not be present in bitstreams conforming to this version of this Specification. Decoders shall ignore decoded picture hash SEI messages that contain reserved values of hash_type.

TABLE 2

Atlas hash type

| hash_type | Method |
| --- | --- |
| 0 | MD5 |
| 1 | CRC |
| 2 | Checksum | daih_decoded_atlas_hash_present_flag: equal to 1 specifies that daih_atlas_md5[i],
daih_atlas_crc or daih_atlas_checksum syntax element is present.
daih_decoded_atlas_hash_present_flag equal to 0 specifies that daih_atlas_md5[i],
daih_atlas_crc or daih_atlas_checksum syntax element will not be present.
daih_decoded_atlas_b2p_hash_present_flag: equal to 1 specifies that daih_atlas_b2p_md5[i],
daih_2_atlas_b2p_cr or daih_atlas_b2p_checksum syntax element is present.
daih_decoded_atlas_b2p_hash_present_flag equal to 0 specifies that daih_atlas_b2p_md5[i],
daih_atlas_b2p_crc or daih_atlas_b2p_checksum will not be present.
daih_decoded_atlas_tiles_hash_present_flag: equal to 1 specifies that daih_atlas_tiles_md5[i],
daih_atlas_tiles_crc or daih_atlas_tiles_checksum syntax element is present.
daih_decoded_atlas_tiles_hash_present_flag equal to 0 specifies that daih_atlas_tiles_md5[i],
daih_atlas_tiles_crc or daih_atlas_tiles_checksum syntax element will not be present.
daih_atlas_tiles_b2p_hash_present_flag: equal to 1 specifies that daih_atlas_tiles_b2p_md5[i],
daih_atlas_tiles_b2p_crc or daih_atlas_tiles_b2p_checksum syntax element is present.
daih_atlas_tiles_b2p_hash_present_flag equal to 0 specifies that daih_atlas_tiles_b2p_md5[i]
daih_atlas_tiles_b2p_crc or daih_atlas_tiles_b2p_checksum will not be present.
daih_atlas_md5[i] is the 16-byte MD5 hash of the decoded atlas associated with vuh_atlas_id. The value of daih_atlas_md5[i] shall be equal to the value of digestVal obtained as follows, using the MD5 functions defined in IETF RFC 1321:

```
MD5Init( context )
MD5Update( context, atlasData, aLen )
MD5Final( digestVal, context )
``` daih_atlas_crc is the cyclic redundancy check (CRC) of the decoded atlas associated with vuh_atlas_id. The value of daih_atlas_crc shall be equal to the value of crcVal obtained as follows, using CRC specification defined in Rec. ITU-T H.271:

```
crc = 0xFFFF
atlasData[ aLen ] = 0
atlasData[ aLen + 1 ] = 0
for( bitIdx = 0; bitIdx < ( aLen + 2 ) * 8; bitIdx++ ) {
    dataByte = atlasData[ bitIdx >> 3 ]
    crcMsb = ( crc >> 15 ) & 1
    bitVal = ( dataByte >> ( 7 - ( bitIdx & 7 ) ) ) & 1
    crc = ( ( ( crc << 1 ) + bitVal ) & 0xFFFF ) ^ ( crcMsb * 0x1021 )
}
crcVal = crc
``` daih_atlas_checksum is the checksum of the decoded atlas associated with vuh_atlas_id. The value of daih_atlas_checksum shall be equal to the value of checksumVal obtained:

```
checksum = 0
for( i = 0; i < aLen ; i++ ) {
    xorMask = ( i & 0xFF ) ^ ( i >> 8 )
    checksum = ( checksum + ( atlasData[ i ] & 0xFF) ^ xorMask) & 0xFFFFFFFF
    checksum = ( checksum + ( atlasData[ i ] >> 8) ^ xorMask) & 0xFFFFFFFF
}
``` daih_atlas_b2p_md5[i] is the 16-byte MD5 hash of the BlockToPatch[ ] [ ] of the atlas associated with vuh_atlas_id. The value of daih_atlas_b2p_md5[i] shall be equal to the value of digestVal obtained as follows, using the MD5 functions defined in IETF RFC 1321:

```
MD5Init( context )
MD5Update( context, atlasB2pData, b2paLen )
MD5Final( digestVal, context )
``` daih_atlas_b2p_crc is the cyclic redundancy check (CRC) of the decoded atlas associated with vuh_atlas_id. The value of daih_atlas_b2p_crc shall be equal to the value of crcVal obtained as follows, using CRC specification defined in Rec. ITU-T H.271:

```
crc = 0xFFFF
atlasB2pData[ b2paLen ] = 0
atlasB2pData[ b2paLen + 1 ] = 0
for( bitIdx = 0; bitIdx < ( b2paLen + 2 ) * 8; bitIdx++ ) {
    dataByte = atlasB2pData[ bitIdx >> 3 ]
    crcMsb = ( crc >> 15 ) & 1
    bitVal = ( dataByte >> ( 7 - ( bitIdx & 7 ) ) ) & 1
    crc = ((( crc << 1 ) + bitVal ) & 0xFFFF ) ^ ( crcMsb * 0x1021 )
}
crcVal = crc
``` daih_atlas_b2p_checksum is the checksum of the decoded atlas associated with vuh_atlas_id. The value of daih_atlas_b2p_checksum shall be equal to the value of checksumVal obtained:

```
checksum =0
for( t = 0; t < daih_num_tiles_minus1 + 1; t++ ) {
    BlockToPatchMapWidth = Ceil(TileGroupWidaih[ t ]/PatchPackingBlockSize)
    BlockToPatchMapHeight = Ceil(TileGroupHeight[ t ]/PatchPackingBlockSize)
    for( y = 0; y < BlockToPatchMapHeight; y++ ) {
        for( x = 0; x < BlockToPatchMapWidth ; x++ ) {
            xorMask = ( x & 0xFF ) ^ ( y & 0xFF ) ^ (x >> 8) ^ (y >> 8)
checksum = ( checksum + ( BlockToPatchMap[ y ][ x ] & 0xFF) ^ xorMask) & 0xFFFFFFFF
checksum = ( checksum + ( BlockToPatchMap[ y ][ x ] >> 8) ^ xorMask) & 0xFFFFFFFF
        }
    }
}
``` daih_num_tiles_minus1+1 specifies the number of tiles for which hash values will be signaled.

The value of daih_num_tiles_minus1 shall be in the range of 0 to afti_num_tiles_in_atlas_frame_minus1, inclusive.

daih_tile_id_len_minus1 plus 1 specifies the number of bits used to represent the syntax element daih_tile_id[t]. The value of daih_tile_id_len_minus1 shall be in the range of 0 to Ceil(Log 2(afti_num_tiles_in_atlas_frame_minus1+1)), inclusive. The value of 1<<(daih_tile_id_len_minus1+1) shall be greater than or equal to daih_num_tile_minus1+1.

daih_tile_id[t] specifies the tile ID of the t-th tile. The length of the daih_tile_id[t] syntax element is daih_tile_id_len_minus1+1 bits. When not present, the value of daih_tile_id[t] is inferred to be equal to t.

daih_atlas_tiles_md5[t][i] is the 16-byte MD5 hash of the t-th tile. The value of daih_atlas_tiles_md5[t][i] shall be equal to the value of digestVal obtained as follows, using the MD5 functions defined in IETF RFC 1321:

```
MD5Init( context )
MD5Update( context, tileData[ t ], dataLen[ t ] )
MD5Final( digestVal, context )
``` daih_atlas_tiles_crc[t] is the cyclic redundancy check (CRC) of the decoded atlas tile with tile ID t, associated with vuh_atlas_id. The value of daih_atlas_tiles_crc shall be equal to the value of crcVal obtained as follows, using CRC specification defined in Rec. ITU-T H.271:

```
crc = 0xFFFF
tileData[ t ][ dataLen[ t ] ] = 0
tileData[ t ][ dataLen[ t ] + 1 ] = 0
for( bitIdx = 0; bitIdx < ( dataLen[ t ] + 2 ) * 8; bitIdx++ ) {
    dataByte = tileData[ bitIdx >> 3 ]
    crcMsb = ( crc >> 15 ) & 1
    bitVal = ( dataByte >> ( 7 - ( bitIdx & 7 ) ) ) & 1
    crc = ( ( ( crc << 1 ) + bitVal ) & 0xFFFF ) ^ ( crcMsb * 0x1021 )
}
crcVal = crc
``` daih_atlas_tiles_checksum[t] is the checksum of the decoded atlas tile with tile ID t, associated with vuh_at-las_id. The value of daih_atlas_tile_checksum shall be equal to the value of checksumVal obtained:

```
checksum = 0
for( i = 0; i < dataLen[ t ] ; i++ ) {
    xorMask = ( i & 0xFF ) ^ ( i >> 8 )
    checksum = ( checksum + ( tileData[ t ][ i ] & 0xFF) ^ xorMask) & 0xFFFFFFFF
    checksum = ( checksum + ( tileData[ t ][ i ] >> 8) ^ xorMask) & 0xFFFFFFFF
}
``` daih_atlas_tiles b2p_md5[t][i] is the 16-byte MD5 hash of the t-th tile, BlockToPatchMap[ ][ ]. The value of daih_blk2patch_md5[t][i] shall be equal to the value of digestVal[t] obtained as follows, using the MD5 functions defined in IETF RFC 1321:

```
MD5Init( context )
MD5Update( context, tileB2pData[ t ], dataB2pLen[ t ] )
MD5Final( digestVal, context )
``` daih_atlas_tiles_b2p_crc[t] is the cyclic redundancy check (CRC) of the decoded atlas tile BlockToPatchMap[ ][ ], with tile ID t, associated with vuh_atlas_id. The value of daih_atlas_tiles_b2p_crc shall be equal to the value of crcVal obtained as follows, using CRC specification defined in Rec. ITU-T H.271:

```
crc = 0xFFFF
tileB2pData[ t ][ dataB2pLen[ t ] ] = 0
tileB2pData[ t ][ dataB2pLen[ t ] + 1 ] = 0
for( bitIdx = 0; bitIdx < ( dataB2pLen[ t ] + 2 ) * 8; bitIdx++ ) {
    dataByte = tileB2pData[ bitIdx >> 3 ]
    crcMsb = ( crc >> 15 ) & 1
    bitVal = ( dataByte >> ( 7 - ( bitIdx & 7 ) ) ) & 1
    crc = ( ( ( crc << 1 ) + bitVal ) & 0xFFFF ) ^ ( crcMsb * 0x1021 )
}
crcVal = crc
``` daih_atlas_tiles_b2p_checksum[t] is the checksum of the decoded atlas tile BlockToPatchMap[ ][ ], with tile ID t, associated with vuh_atlas_id. The value of daih_atlas_tile_checksum shall be equal to the value of checksumVal obtained:

```
checksum =0
BlockToPatchMapWidth = Ceil(TileGroupWidth[ t ]/PatchPackingBlockSize)
BlockToPatchMapHeight = Ceil(TileGroupHeight[ t ]/PatchPackingBlockSize)
for( y = 0; y < BlockToPatchMapHeight; y++ ) {
    for( x = 0; x < BlockToPatchMapWidth ; x++ ) {
        xorMask = ( x & 0xFF ) ^ ( y & 0xFF ) ^ ( x >> 8 ) ^ ( y >> 8 )
checksum = ( checksum + ( BlockToPatchMap[ y ][ x ] & 0xFF) ^ xorMask) & 0xFFFFFFFF
checksum = ( checksum + ( BlockToPatchMap[ y ][ x ] >> 8) ^ xorMask) & 0xFFFFFFFF
    }
}
```

A decoded atlas information hash SEI message together with its syntax and semantics is described herein. To ensure proper decoding of a block to volume information at conformance point A, and the correct reconstruction of volumetric data, the "BlockToPatch" hash value is included, as well. In addition to the md5 method of checksum calculation, two other hash types are listed for potential extensibility, namely: CRC and checksum. An Annex B like section is able to be included in the V3C/V-PCC Specification, to provide examples for nominal derivations of hash checksum values. Several variables related to high level syntax elements that are used in Annex B and for reconstruction section H.9 are able to be included, as a "frame header" for the hash message checksum calculations.

FIG. 1 illustrates a flowchart of a method of encoding and decoding content according to some embodiments. In the step 100, point cloud content is encoded. Encoding the content is able to be implemented in any manner such as using a V-PCC encoding implementation which compresses point clouds based on projection from 3D to 2D. The method maps the 3D point cloud data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction. Two possible MPEG technologies for point cloud compression include: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC.

In the step 102, a hash is generated and sent. As described herein a hash is generated using syntax elements and/or variable values of the content. In some embodiments, a hash is sent for an atlas or the hash for the block to patch of the atlas. In some embodiments, the hash is sent for a tile or the hash for the block to patch of the tile. The hash is sent in an SEI message.

In the step 104, the encoded content (point cloud) is decoded. Any decoder is able to be used such as an MPEG implementation.

In the step 106, the decoded content is verified using the hash information. The decoded content is verified using the hash information via any hash comparison technique.

In some embodiments, fewer or additional steps are able to be implemented. In some embodiments, the order of the steps is modified.

Figure 2:
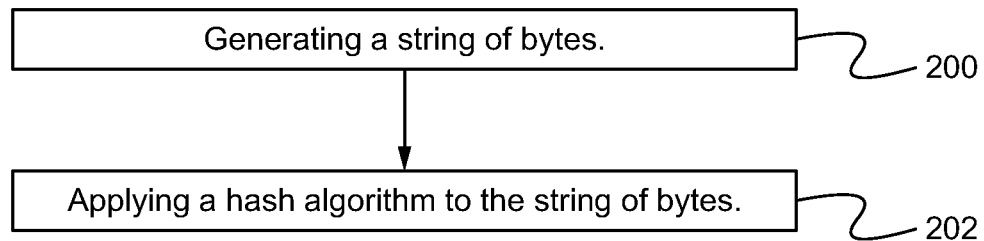
FIG. 2 illustrates a flowchart of generating a hash according to some embodiments.

FIG. 2 illustrates a flowchart of generating a hash according to some embodiments. Previously, a hash was based on luminous, color and/or other pixel values. In the step 200, a string of bytes is generated by combining values of the syntax elements or other information of the content (e.g., atlas or tile). For example, for the atlas, the frame width is put in two bytes (or some other value). Then, the frame height is the next two bytes. Other syntax elements (of the atlas) and variable values are added to this string to generate a large string (e.g., 256 bytes). In the step 202, a hash algorithm is applied to the string of bytes to generate a hash. The hash algorithm is able to be selected based on a defined variable. For example, a lookup table or database is able to store multiple hash algorithms or similar algorithms (e.g., Cyclic Redundancy Checks), and based on a defined variable, the selected hash algorithm is applied. As discussed herein, a variable value of 0 corresponds with the hash algorithm MD5, a variable value of 1 corresponds with CRC, and a variable value of 2 corresponds with Checksum, while additional variable values are able to be reserved for additional hash algorithms. In some embodiments, fewer or additional steps are implemented. In some embodiments, the order of the steps is modified.

Figure 3:
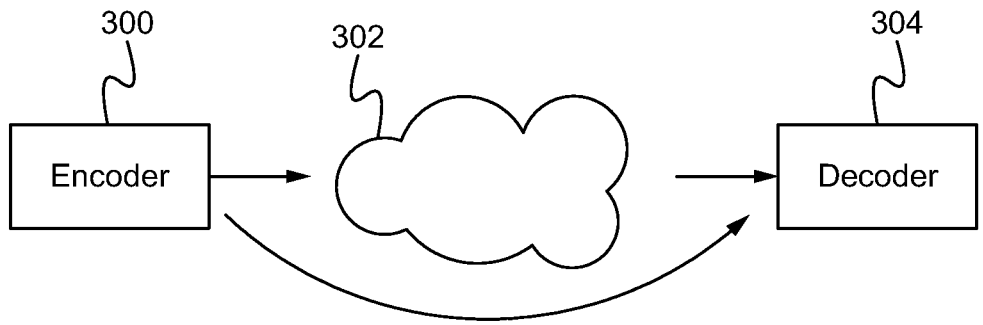
FIG. 3 illustrates a diagram of a system configured to implement the hash according to some embodiments.

FIG. 3 illustrates a diagram of a system configured to implement the hash according to some embodiments. An encoder 300 is configured to implement the encoding process. As described herein any encoding is able to be implemented such as the V-PCC encoding using one or more MPEG implementations. In addition the encoder generates the hash information to be communicated with the encoded content. The encoded information and hash information are able to be communicated directly to a decoder 304 or over a network 302. The network is able to be any type of network such as a Local Area Network (LAN), the Internet, a wireless network, a wired network, a cellular network, and/or any other network or combination of networks. The decoder 304 decodes the encoded content and verifies the decoded content using the hash information.

Figure 4:
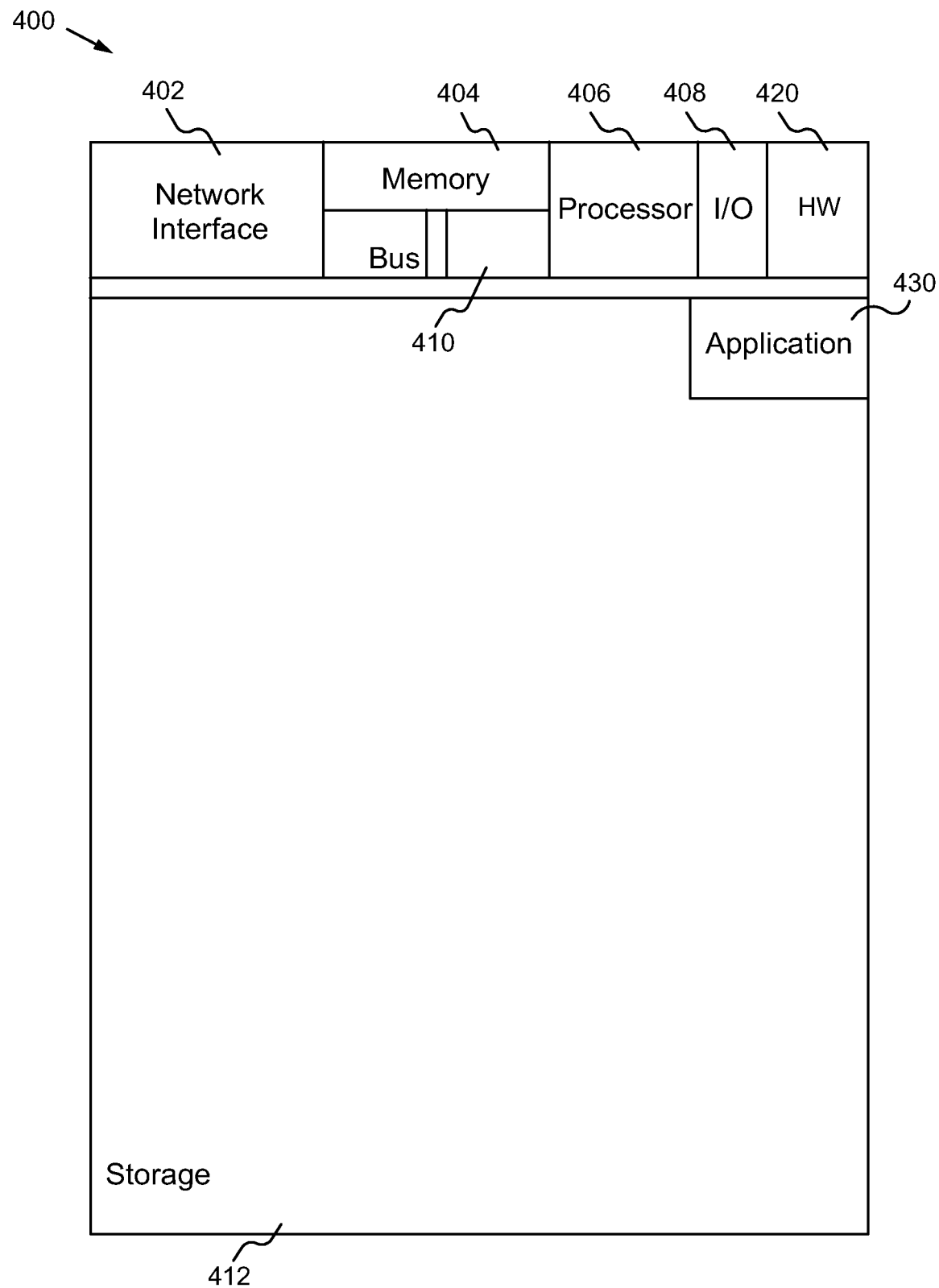
FIG. 4 illustrates a block diagram of an exemplary computing device configured to implement the decoded tile hash SEI message according to some embodiments.

FIG. 4 illustrates a block diagram of an exemplary computing device configured to implement the decoded tile hash SEI message according to some embodiments. The computing device 400 is able to be used to acquire, store, compute, process, communicate and/or display information such as images and videos including 3D content. The computing device 400 is able to implement any of the encoding/decoding aspects. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Decoded tile hash SEI message application(s) 430 used to implement the decoded tile hash SEI message implementation are likely to be stored in the storage device 412 and memory 404 and processed as applications are typically processed. More or fewer components shown in FIG. 4 are able to be included in the computing device 400. In some embodiments, decoded tile hash SEI message hardware 420 is included. Although the computing device 400 in FIG. 4 includes applications 430 and hardware 420 for the decoded tile hash SEI message implementation, the decoded tile hash SEI message is able to be implemented on a computing device in hardware, firmware, software or any combination thereof. For example, in some embodiments, the decoded tile hash SEI message applications 430 are programmed in a memory and executed using a processor. In another example, in some embodiments, the decoded tile hash SEI message hardware 420 is programmed hardware logic including gates specifically designed to implement the decoded tile hash SEI message.

In some embodiments, the decoded tile hash SEI message application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the decoded tile hash SEI message, a device acquires or receives 3D content (e.g., point cloud content and processes and/or sends the content with an SEI message containing hash information to ensure the 3D content is decoded properly. The decoded tile hash SEI message is able to be implemented with user assistance or automatically without user involvement.

In operation, the decoded tile hash SEI message enables more efficient and more accurate 3D content encoding compared to previous implementations.

Some Embodiments of Decoded Tile Hash SEI Message for V3C/V-PCC

1. A method comprising:
   encoding point cloud content to generate encoded point cloud content;
   generating and sending hash information;
   decoding the encoded point cloud content; and
   verifying the decoded content using the hash information.
2. The method of clause 1 wherein encoding the point cloud content includes using a V-PCC encoding implementation which compresses point clouds based on projection from 3D to 2D, wherein encoding the point cloud content includes mapping the 3D point cloud data into several 2D patches and arranging the patches into an atlas image, which is subsequently encoded with a video encoder, wherein atlas images correspond to geometry of points, respective texture, and an occupancy map that indicates which positions are to be considered for point cloud reconstruction.
3. The method of clause 1 wherein the hash information is generated using syntax elements and/or variable values of the point cloud content.
4. The method of clause 1 wherein the hash information is sent for an atlas.
5. The method of clause 1 wherein the hash information is sent for a block to patch of an atlas.
6. The method of clause 1 wherein the hash information is sent for a tile.
7. The method of clause 1 wherein the hash information is sent for a block to patch of a tile.
8. The method of clause 1 wherein the hash information is sent in a Supplemental Enhancement Information (SEI) message.
9. The method of clause 8 wherein the SEI message includes tile-based "BlockToPatchMap[ ][ ]" hash value information.
10. The method of clause 1 wherein the hash information is generated using an implementation selected from the group consisting of MD5, CRC and checksum.
11. An apparatus comprising:
    a non-transitory memory for storing an application, the application for:
      receiving encoded point cloud content;
      receiving hash information;
      decoding the encoded point cloud content; and
      verifying the decoded content using the hash information; and
    a processor coupled to the memory, the processor configured for processing the application.
12. The apparatus of clause 11 wherein the hash information is generated using syntax elements and/or variable values of the point cloud content.
13. The apparatus of clause 11 wherein the hash information is sent for an atlas.
14. The apparatus of clause 11 wherein the hash information is sent for a block to patch of an atlas.
15. The apparatus of clause 11 wherein the hash information is sent for a tile.
16. The apparatus of clause 11 wherein the hash information is sent for a block to patch of a tile.
17. The apparatus of clause 11 wherein the hash information is sent in a Supplemental Enhancement Information (SEI) message.
18. The apparatus of clause 17 wherein the SEI message includes tile-based "BlockToPatchMap[ ][ ]" hash value information.
19. The apparatus of clause 11 wherein the hash information is generated using an implementation selected from the group consisting of MD5, CRC and checksum.
20. A system comprising:
    one or more cameras for acquiring three dimensional content;
    an encoder for:
      encoding the three dimensional content to generate encoded point cloud content; and
      generating and sending hash information; and
    a decoder for:
      decoding the encoded point cloud content; and
      verifying the decoded content using the hash information.
21. The system of clause 20 wherein encoding the three dimensional content includes using a V-PCC encoding implementation which compresses three dimensional content based on projection from 3D to 2D, wherein encoding the three dimensional content includes mapping the 3D point cloud data into several 2D patches and arranging the patches into an atlas image, which is subsequently encoded with a video encoder, wherein atlas images correspond to geometry of points, respective texture, and an occupancy map that indicates which positions are to be considered for point cloud reconstruction.

22. The system of clause 20 wherein the hash information is generated using syntax elements and/or variable values of the three dimensional content.

23. The system of clause 20 wherein the hash information is sent for an atlas.

24. The system of clause 20 wherein the hash information is sent for a block to patch of an atlas.

25. The system of clause 20 wherein the hash information is sent for a tile.

26. The system of clause 20 wherein the hash information is sent for a block to patch of a tile.

27. The system of clause 20 wherein the hash information is sent in a Supplemental Enhancement Information (SEI) message.

28. The system of clause 27 wherein the SEI message includes tile-based "BlockToPatchMap[ ][ ]" hash value information.

29. The system of clause 20 wherein the hash information is generated using an implementation selected from the group consisting of MD5, CRC and checksum.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
   encoding point cloud content to generate encoded point cloud content;
   generating hash information for an atlas, wherein generating the hash information includes combining values of syntax elements of the atlas comprising a frame width of the atlas, a frame height of the atlas and variable values and applying a hash algorithm to the combined values of syntax elements, wherein the hash algorithm is selected based on a defined variable using a lookup table to store multiple hash algorithms;
   sending the hash information;
   decoding the encoded point cloud content; and
   verifying the decoded content using the hash information.

2. The method of claim 1 wherein encoding the point cloud content includes using a V-PCC encoding implementation which compresses point clouds based on projection from 3D to 2D, wherein encoding the point cloud content includes mapping the 3D point cloud data into several 2D patches and arranging the patches into the atlas, which is subsequently encoded with a video encoder, wherein atlas images correspond to geometry of points, respective texture, and an occupancy map that indicates which positions are to be considered for point cloud reconstruction.

3. The method of claim 1 wherein the hash information is sent for a block to patch of the atlas.

4. The method of claim 1 wherein the hash information is sent for a tile.

5. The method of claim 1 wherein the hash information is sent for a block to patch of a tile.

6. The method of claim 1 wherein the hash information is sent in a Supplemental Enhancement Information (SEI) message.

7. The method of claim 6 wherein the SEI message includes tile-based "BlockToPatchMap[ ][ ]" hash value information.

8. The method of claim 1 wherein the hash information is generated using an implementation selected from the group consisting of MD5, CRC and checksum.

9. An apparatus comprising:
   a non-transitory memory for storing an application, the application for:
     receiving encoded point cloud content;
     receiving hash information for an atlas, wherein the hash information includes combined values of syntax elements of the atlas comprising a frame width of the atlas, a frame height of the atlas and variable values and applying a hash algorithm to the combined values of syntax elements, wherein the hash algorithm is selected based on a defined variable using a lookup table to store multiple hash algorithms;
     decoding the encoded point cloud content; and
     verifying the decoded content using the hash information; and
   a processor coupled to the memory, the processor configured for processing the application.

10. The apparatus of claim 9 wherein the hash information is sent for a block to patch of the atlas.

11. The apparatus of claim 9 wherein the hash information is sent for a tile.

12. The apparatus of claim 9 wherein the hash information is sent for a block to patch of a tile.

13. The apparatus of claim 9 wherein the hash information is sent in a Supplemental Enhancement Information (SEI) message.

14. The apparatus of claim 13 wherein the SEI message includes tile-based "BlockToPatchMap[ ][ ]" hash value information.

15. The apparatus of claim 9 wherein the hash information is generated using an implementation selected from the group consisting of MD5, CRC and checksum.

16. A system comprising:
   one or more cameras for acquiring three dimensional content;
   an encoder for:
     encoding the three dimensional content to generate encoded point cloud content; and
     generating hash information for an atlas, wherein generating the hash information includes combining values of syntax elements of the atlas comprising a frame width of the atlas, a frame height of the atlas and variable values and applying a hash algorithm to the combined values of syntax elements, wherein the hash algorithm is selected based on a defined variable using a lookup table to store multiple hash algorithms;
   sending the hash information; and
   a decoder for:
     decoding the encoded point cloud content; and
     verifying the decoded content using the hash information.

17. The system of claim 16 wherein encoding the three dimensional content includes using a V-PCC encoding implementation which compresses three dimensional content based on projection from 3D to 2D, wherein encoding the three dimensional content includes mapping the 3D point cloud data into several 2D patches and arranging the patches into the atlas, which is subsequently encoded with a video encoder, wherein atlas images correspond to geometry of points, respective texture, and an occupancy map that indicates which positions are to be considered for point cloud reconstruction.

18. The system of claim 16 wherein the hash information is sent for a block to patch of the atlas.

19. The system of claim 16 wherein the hash information is sent for a tile.

20. The system of claim 16 wherein the hash information is sent for a block to patch of a tile.

21. The system of claim 16 wherein the hash information is sent in a Supplemental Enhancement Information (SEI) message.

22. The system of claim 21 wherein the SEI message includes tile-based "BlockToPatchMap[ ][ ]" hash value information.

23. The system of claim 16 wherein the hash information is generated using an implementation selected from the group consisting of MD5, CRC and checksum.

* * * * *